United States Patent [19]

Nakayama et al.

[11] Patent Number: 4,932,066
[45] Date of Patent: Jun. 5, 1990

[54] INFORMATION SIGNAL TRANSMISSION SYSTEM

[75] Inventors: Tadayoshi Nakayama, Yokohama; Chikara Sato; Kenichi Nagasawa, both of Kawasaki; Tomohiko Sasatani, Yokohama; Katsuji Yoshimura, Kawasaki; Koji Takahashi, Yokohama; Susumu Kozuki, Tokyo, all of Japan

[73] Assignee: Canon Kabushiki Kaisha, Tokyo, Japan

[21] Appl. No.: 277,421

[22] Filed: Nov. 23, 1988

Related U.S. Application Data

[63] Continuation of Ser. No. 918,527, Oct. 14, 1986, abandoned.

[30] Foreign Application Priority Data

| Oct. 15, 1985 | [JP] | Japan | 60-230510 |
| Oct. 24, 1985 | [JP] | Japan | 60-238501 |
| Oct. 24, 1985 | [JP] | Japan | 60-238503 |
| Oct. 28, 1985 | [JP] | Japan | 60-240762 |
| Nov. 22, 1985 | [JP] | Japan | 60-263080 |

[51] Int. Cl.$^5$ ............................................. G06K 9/00
[52] U.S. Cl. ....................................... 382/56; 358/135
[58] Field of Search ................... 382/56; 358/133, 135, 358/136, 426, 262.1

[56] References Cited

U.S. PATENT DOCUMENTS

| 3,580,999 | 5/1971 | Mounts | 358/136 |
| 3,603,725 | 9/1971 | Cutler | 358/136 |
| 3,749,829 | 7/1973 | Burns et al. | 358/136 |
| 4,090,221 | 5/1978 | Connor | 358/136 |
| 4,155,097 | 5/1979 | Lux | 358/135 |
| 4,597,010 | 6/1986 | Carr | 358/135 |
| 4,633,326 | 12/1986 | Endoh et al. | 382/56 |

Primary Examiner—Leo H. Boudreau
Attorney, Agent, or Firm—Robin, Blecker, Daley & Driscoll

[57] ABSTRACT

A system for transmitting information signal in which a temporally correlated group of image planes are continuously formed comprises: dividing means which divides the information signal into separate image planes and further divides each image plane portion of the signal into a plurality of blocks; first transmitting means for transmitting in a first degree of information density the first of the plurality of blocks obtained from the dividing means; second transmitting means for transmitting in a second degree of information density the second of the plurality of divided blocks obtained from the dividing means; and transmission inhibiting means for inhibiting transmission of the third of the plurality of divided blocks obtained from the dividing means by dividing a present image plane portion of the information signal.

7 Claims, 5 Drawing Sheets

INFORMATION SIGNAL TRANSMISSION SYSTEM

This application is a continuation of application Ser. No. 918,527 filed Oct. 14, 1986.

BACKGROUND OF THE INVENTION

1. Field of the Invention

This invention relates to an image information transmitting system and more particularly to a system for continuously transmitting a temporally correlated group of image planes.

2. Description of the Related Art

In transmitting information such as image information, it is always the theme of efforts to reproduce the original information with a higher degree of fidelity with a smaller amount of transmitting information. Hence, varied kinds of transmission methods have been proposed for this purpose.

These methods include adaptive type variable density sampling methods of appropriately changing sampling density, that is, varying the density of information being transmitted. An example of this method has been disclosed and known by the name of a time axis transforming band compressing method (hereinafter referred to as TAT method) The TAT method is briefly described below:

FIG. 1 of the accompanying drawings shows the fundamental concept of the TAT method. An original signal is divided as indicated by broken lines into blocks by a predetermined period of time. The information contained in the original signal within each divided block is checked to discriminate its degree of density. When any of the blocks is thus found to be dense, data obtained by sampling the original signal of the block is completely transmitted as transmission data. For a block determined to be sparse, only a portion of data is transmitted while the rest is regarded as skipped data and is not transmitted.

The arrangement according to this concept decreases the amount of data to be transmitted per unit time and thus permits the transmission signal to be band compressed. The data thus transmitted is used by the receiving side for forming data corresponding to the skipped data. In other words, some interpolation data which is in proximity to the skipped data is obtained by computation by using the transmitted data. Since the interpolation data corresponds to a sparse part of the information signal, it is in close proximity to the skipped data. Compared with a case where the whole data is transmitted, the interpolating arrangement gives a reproduced signal with a fairly high degree of fidelity to the original signal while the transmission band can be reduced to a great degree by the arrangement. In other words, the amount of information to be transmitted is reduced by the arrangement.

Meanwhile, the elaborateness or fineness of the original signal within each of the divided blocks are examined in making a discrimination between transmitting the whole sampling data and transmitting just a portion thereof. Information on the result of this discrimination is also transmitted along with the transmission data as transmission mode information.

In the case of image information, transmission according to the above-stated concept is performed in the following manner: The image information has a two-dimensional spread and has a correlativity between horizontal and vertical directions. Therefore, transmission of image information can be more effectively accomplished by arranging the intervals of sampling to be variable not only in the horizontal direction but also in the vertical direction. This idea will be called the two-dimensional TAT method. The following is the brief description of the two-dimensional TAT method:

FIG. 2 is a data transmission pattern of the two-dimensional TAT method. In this method, one picture plane is divided into a plurality of picture element blocks. Each of the divided blocks consists of an m×n number of picture elements. The transmission data density of one picture element block is arranged to be variable from another and independently of another. In the case of FIG. 2, each picture element block consists of 4×4 picture elements and is arranged to be transmissible in two different transmission modes. In FIG. 2, each mark " " represents a picture element to be transmitted and another mark "X" a picture element to be skipped. A reference symbol E denotes a transmission pattern in which data of all the picture elements is transmitted; and another symbol C a pattern in which only a portion of data of all the picture elements within one block is transmitted. Hereinafter, the mode of transmission in the former pattern will be called the E mode and transmission in the latter the C mode respectively. As apparent from the illustration, data is transmitted in the C mode with ¼ of the information transmitting density of the E mode. In the case of the C mode, the original image plane is reproduced by forming interpolating picture element data for each of the skipped picture elements on the basis of the transmitted data representing a picture element located near to the skipped one within the same picture element block. A system for carrying out the two-dimensional TAT method is arranged as described below with reference to FIG. 3:

FIG. 3 is a block diagram showing by way of example a analog transmission system. An incoming video signal is sampled for all the picture elements thereof by an analog-to-digital (hereinafter referred to A/D) converter 1. By this, data for all the picture elements is generated. This all-picture-element data is supplied to a skipping circuit 2. The circuit 2 performs a skipping operation in a manner corresponding to the C mode pattern shown in FIG. 2. The circuit 2 thus produces C mode picture element data. The C mode picture element data is supplied to an interpolation circuit 3, which performs computing operation to obtain interpolation picture element data corresponding to the skipped picture elements. The interpolation picture element data is supplied to a mode discrimination circuit 4 together with the all-picture-element data produced from the A/D converter 1. Then, each picture element block is determined whether it is to be transmitted in the C mode or in the E mode. At the mode discrimination circuit 4, computation is performed for each of the picture element blocks to obtain a difference between the picture element data produced from the A/D converter 1 and the interpolation picture element data. The sum of the difference (hereinafter referred to as a block distortion) is computed for every picture element block and then a total difference thus obtained for one field portion of the signal is stored in a memory.

Before arrival of the data of a next field, the distribution of block distortions of all the picture element blocks is thus obtained. In this instance, the ratio of the number of picture element blocks to be transmitted in the C mode to that of the picture element blocks to be transmitted in the E mode must be arranged to be unvarying. For example, assuming that ⅔ of all the picture element blocks are to be transmitted in the C mode and ⅓ of these blocks to be transmitted in the E mode, a total number of transmission data (or the rate of compression) becomes (⅔×¼+⅓×1=)½. Therefore, in accordance with the distribution of the block distortion covering all the picture element blocks, a threshold value of distortion is predetermined for determining a boundary between the C mode and the E mode.

Following this, at the time of arrival of the incoming video signal for the next field, the stored block distortion values are read out one after another and compared with the threshold value to determine thereby the transmission mode to be selected. In case that the read out distortion value coincides with the threshold value, the transmission mode is determined in such a manner that the number of the picture element blocks to be transmitted in the C mode and that of the blocks to be transmitted in the E mode are in the predetermined ratio.

A mode discrimination signal which is thus obtained in the above-stated manner is supplied to a switch 7. Then, the picture element data is selectively read out from a buffer 5 which is provided for the picture element data of the E mode and a buffer 6 which is for the picture element data of the C mode. The output of the switch 7 is supplied as the transmission data to a digital-to-analog (D/A) converter 8 to be converted back into an analog video signal. This signal is then produced to a transmission line. Further, the mode discrimination signal is also produced to the transmission line via a buffer 9 as a mode signal.

FIG. 4 shows in outline the arrangement of the receiving side of the two-dimensional TAT transmission system. The video signal which has been processed in the manner as described in the foregoing and supplied via the transmission line is received at an A/D converter 10 to be converted back into a digital signal. The output of the A/D converter 10 is supplied to a C mode interpolation circuit 11. The circuit 11 performs a computing operation to obtain interpolation data corresponding to the skipped picture element data in the C mode.

Meanwhile, the transmitted mode discrimination signal or mode information signal controls a switch 12. The connecting position of the switch 12 is shifted to its one side E when the signal indicates the E mode and to the other side C thereof when the signal indicates the C mode. Through this switch 12, the whole picture element data including the E mode picture element data, the C mode picture element data and the interpolation picture element data is stored gradually at a frame memory 13. The stored data is read out from the frame memory 13 in a sequence, for example, according to a television signal. The read out data is produced via a D/A converter 14.

As described above, the image information can be effectively transmitted by the transmission system operating according to the two-dimensional TAT method. However, when a television signal which is obtained in the manner described above is displayed, deterioration becomes conspicuous in resolution in a still picture region although the resolution is acceptable in a motional picture region. Meanwhile, in the still region on the image plane, there is a high correlativity in the time axial direction. A method of utilizing this correlativity in the time axial direction has recently advanced.

In the transmission system embodying the two dimensional TAT method mentioned in the foregoing, there is provided no particular arrangement to make a distinction between the still region or part and a motional part of the image plane even in continuously transmitting a group of image planes having a temporal correlation among them. Therefore, in the event of a still part having an extremely high degree of correlativity on the time base or time axis, similar image information is repeatedly transmitted many times and thus results in a very poor transmission efficiency. Further, on some occasions, a still picture region is not adequately reproduced. In case that the whole image plane is a still picture in particular, the deterioration of resolution becomes salient in the C mode transmission part.

The still picture region is not always completely motionless but there are some occasions on which some motion is included in a still picture region. Hence, it is extremely difficult to determine the information on each picture element block as to whether it is to be transmitted or not to be transmitted.

Let us assume a case wherein comparison is made between two temporally continuing image planes to obtain a difference between their picture elements and further to obtain data (temporal distortion) for temporal correlativity by summing up the difference between the whole blocks. It is then conceivable to determine transmission or no transmission for each picture element block on the basis of the data obtained in this manner. In that case, however, there arises the following inconvenience:

For example, there is a case where a picture of two-dimensional frequency such as a background scenery slowly moves while, in another case, an extremely small object moves over a picture plane. In the former case, the above-stated temporal distortion becomes conspicuous. The system is arranged to transmit no information about the former image or picture plane while information about the latter image plane is transmitted as the small object is not readily observable on the image plane and tends to bring about some discrepancy between it and the above-stated temporally distorted data.

To enhance transmission efficiency, it is conceivable to make variable the sampling period within the frame of continuing image planes and in the time axial direction by utilizing both the correlativity within each frame and the correlativity between frames. In that case, however, there arises the following problem:

With variable density sampling performed in the time axial direction, the amount of image information per frame generally comes to vary. In cases where image information for which the transmission time per frame is predetermined and fixed as in the case of a television signal is to be transmitted, arrangement to have a fixed interval at which each data is transmitted hinders adjustment of transmission time and thus makes system arrangement difficult. Further, the arrangement to make the data transmission interval variable results in the complex hard-ware arrangement of the transmission system.

To solve this problem, it is conceivable that, for the still picture region, a process utilizing the temporal correlativity, such as composing a reproduced image plane by using the data of an image plane transmitted immediately before, is arranged to be performed on the receiving side. However, in such a system, the arrangement to determine each block to be transmitted in the E mode or in the C mode in the same manner as in the case of the above-stated two-dimensional TAT method comes to present the following problem:

Considering now two picture element blocks within an image plane, let us assume that one of the blocks represents a highly elaborate portion of the image plane but little varies from a preceding image plane while the other is not so elaborate and varies from the preceding image plane. In this instance, the former is transmitted in the E mode and the latter in the C mode in accordance with the two-dimensional TAT method described. Then, with the process utilizing the temporal correlativity performed on the receiving side, the former picture element block can be reproduced in a image which little varies from an image obtainable from transmission in the E mode. Whereas, with the latter picture element block transmitted in the C mode, it hardly can be reproduced with a high degree of resolution even through a spatial interpolating process or a process utilizing the temporal correlativity. In other words, in order to obtain a reproduced image plane with high resolution, the transmission in the E mode should be performed for the latter picture element block rather than for the former. Therefore, in this instance, the determination of the transmission mode in accordance with the two-dimensional TAT method becomes irrational.

SUMMARY OF THE INVENTION

It is a general object of this invention to provide an information signal transmission system which is capable of solving the problems described in the foregoing.

It is a more specific object of this invention to provide an information signal transmission system which is capable of efficiently transmitting an information signal by inhibiting transmission of redundant information during transmission of the information signal.

Under this object, an information signal transmission system arranged according to this invention as an embodiment thereof to transmit an information signal which continuously forms a group of image planes having temporal correlativity among them comprises: dividing means which divides the information signal into separate image planes and further divides each image plane portion of the signal into a plurality of blocks; first transmitting means for transmitting in a first degree of information density the first of the plurality of blocks obtained from the dividing means; second transmitting means for transmitting in a second degree of information density the second of the plurality of divided blocks obtained from the dividing means; and transmission inhibiting means for inhibiting transmission of the third of the plurality of divided blocks obtained from the dividing means by dividing a present image plane portion of the information signal.

It is another object of this invention to provide an information signal transmission system of high transmission efficiency which is capable of adequately selecting information to be transmitted on the basis of correlativity among image planes in transmitting the information signal.

Under that object, an information signal transmission system arranged according to this invention as another embodiment thereof to transmit an information signal which continuously forms a group of temporally correlated image planes comprises: dividing means which divides the information signal into separate image planes and further divides each image plane portion of the signal into a plurality of blocks; transmitting means for transmitting some of the plurality of blocks obtained by the dividing means; first data generating means for generating first data on the basis of the temporal correlativity of the image planes; second data generating means for generating second data on the basis of the planar correlativity of the image plane; and selecting means arranged to select according to the first and second data the blocks to be transmitted by the transmitting means from among the plurality of blocks obtained from the dividing means.

It is a further object of this invention to provide an information signal transmission system which is capable of transmitting the information signal by varying the density of information without deteriorating the information signal in transmitting the signal.

Under that object, an information signal transmission system arranged as a further embodiment of this invention to transmit an information signal which continuously forms a group of image planes having temporal correlativity among them comprises: dividing means which divides the information signal into separate image planes and further divides each image plane portion of the signal into a plurality of blocks; transmitting means for transmitting the information signal by varying as necessary the information density of some of the plurality of blocks obtained from the dividing means; first data generating means for generating first data on the basis of the temporal correlativity of the image planes; second data generating means for generating second data on the basis of the planar correlativity of the image plane; and control means for controlling, by using the first and second data, the information density of each of the plurality of blocks at the transmitting means in such a manner as to make the amount of information of each image plane portion of the information signal unvarying in transmitting the signal.

Further, under that object, an information signal transmission system arranged as a further embodiment of this invention to transmit an information signal which continuously forms a group of temporally correlated image planes comprises: dividing means which divides the information signal into separate image planes and further divides each image plane portion of the signal into a plurality of blocks; transmitting means for transmitting the information signal by varying the information density of each of the plurality of blocks obtained from the dividing means; first data generating means for generating first data for each of the plurality of blocks obtained by the dividing means on the basis of the temporal correlativity of the group of image planes; second data generating means for generating second data for each of the plurality of blocks obtained by the dividing means on the basis of the planar correlativity of the image planes; and selecting means arranged to select from among the plurality of blocks such blocks that have high information density for transmission by the transmitting means, the selection being made by using either the first or second data whichever has stronger correlativity than the other.

It is a still further object of this invention to provide an information signal transmission system which is capable of correctly reproducing information of an information signal even with the information signal transmitted by varying the information density thereof.

Under that object, an information signal transmission system arranged as an embodiment of this invention to transmit an information signal which continuously forms a group of temporally correlated image planes comprises: a transmitting device including dividing means which divides the information signal into separate image planes and further divides each image plane portion of the signal into a plurality of blocks, first transmitting means for transmitting in a first degree of information density the first of the plurality of blocks obtained from the dividing means, second transmitting means for transmitting the second of the plurality of divided blocks in a second degree of information density which is lower than the first degree of information density, third transmitting means for transmitting in a third degree of information density the third of the plurality of blocks within an image plane preceding an image plane presently being divided into the plurality of blocks by the dividing means by an n (n: a positive integer) number of image planes and transmission mode signal transmitting means arranged to generate and transmit a transmission mode signal indicative of the information density at which each of the plurality of divided blocks is to be transmitted; and a receiving device including first storing means for storing, by image planes, the information signal transmitted by the transmitting device, second storing means for storing the information signal of an image plane preceding an image plane of the information signal presently being transmitted by the transmitting device by an m (m: a positive integer) number of image planes, comparison means arranged to compare the information signal presently transmitted by the transmitting device with the information signal stored at the second storing means and to generate a comparison signal and writing control means for controlling a writing action on the first storing means in accordance with the comparison signal.

Further objects and features of this invention will become apparent from the following detailed description of embodiment thereof taken in connection with the accompanying drawings.

DETAILED DESCRIPTION OF THE PREFERRED EMBODIMENTS

An embodiment of this invention is described in the following:

The embodiment is a transmission system employing the above-stated two-dimensional TA method and in addition to that is arranged to reduce the number of transmission data by utilizing the temporal correlativity of image information. The embodiment, therefore, may be called a three-dimensional TAT system. In the case of this three-dimensional TAT system, by taking the advantage of the fact that the receiver side of the system is not required to renew picture element data for the still or unmoving part of the image plane, the picture quality is arranged to be further increased with the same amount of data transmitted as in the case of the two-dimensional TAT method. The basic concept of this embodiment: With regard to the picture element data within the still part, after transmission of all the picture element data of the image plane, the still picture element data block is not transmitted in transmitting the ensuing image planes and is repeatedly used for the ensuing image planes. For the ensuing image plane, the skip of the picture element block which is thus skipped over is indicated by simply transmitting information thereon. Hereinafter, this transmission mode will be called the p mode. Meanwhile, for distinction from the two-dimensional TAT method, the transmission modes which correspond to the E mode and the C mode of the two-dimensional TAT will be called the e and c modes respectively. The arrangement to increase the number of the picture element blocks transmitted in the p mode permits reduction in the number of picture element blocks and the amount of data to be transmitted.

Assuming that the same amount of data is to be transmitted as in the case of the two-dimensional TAT method, the number of picture element blocks to be skipped increases when the number of picture element blocks to be transmitted in the p mode increases. This enables transmission of picture element blocks in the c mode with a higher degree of information density. On the side of the receiver, therefore, the number of picture element blocks having a high degree of resolution increases according as the still part increases. The quality of the picture thus reproduced can be further increased. The picture or image thus can be reproduced with a very high degree of resolution in transmitting the same amount of data as in the case of the two-dimensional TAT method. Therefore, the efficiency of transmission can be enhanced.

Figure 1:
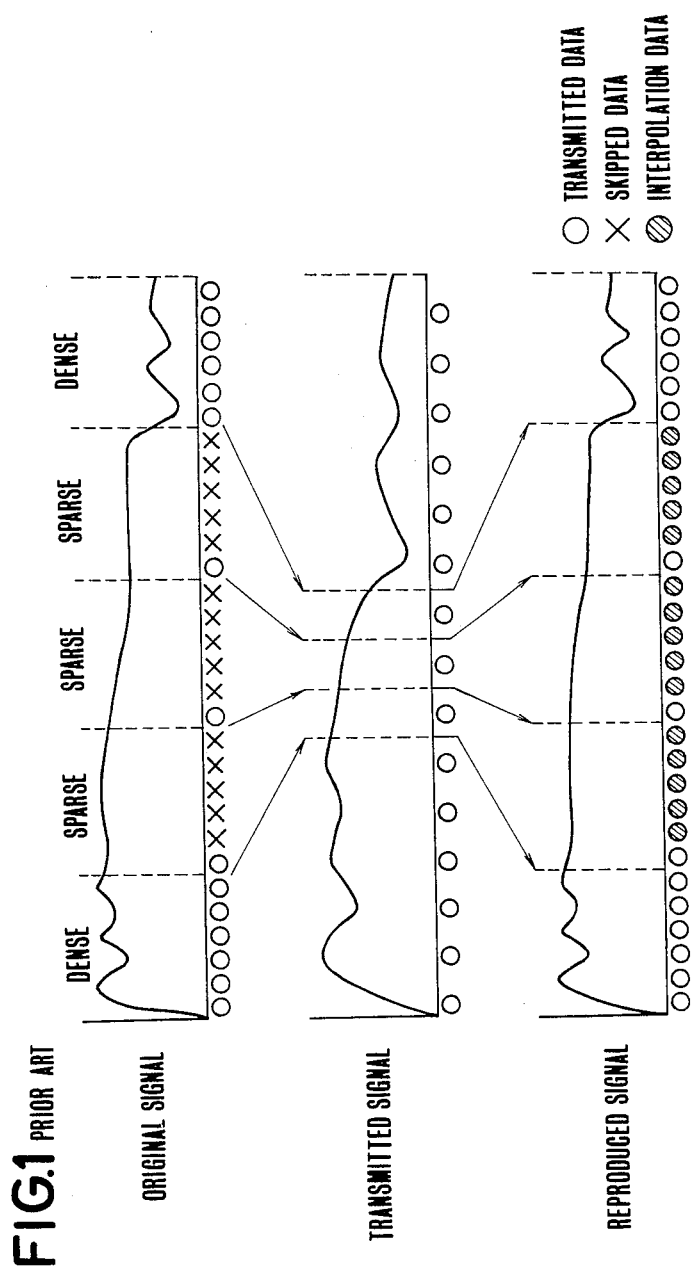
FIG. 1 is an illustration of the basic concept of the TAT method.
Figure 2:
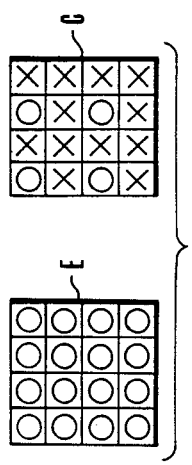
FIG. 2 is an illustration of the data transmitting pattern of the two-dimensional TAT method.
Figure 3:
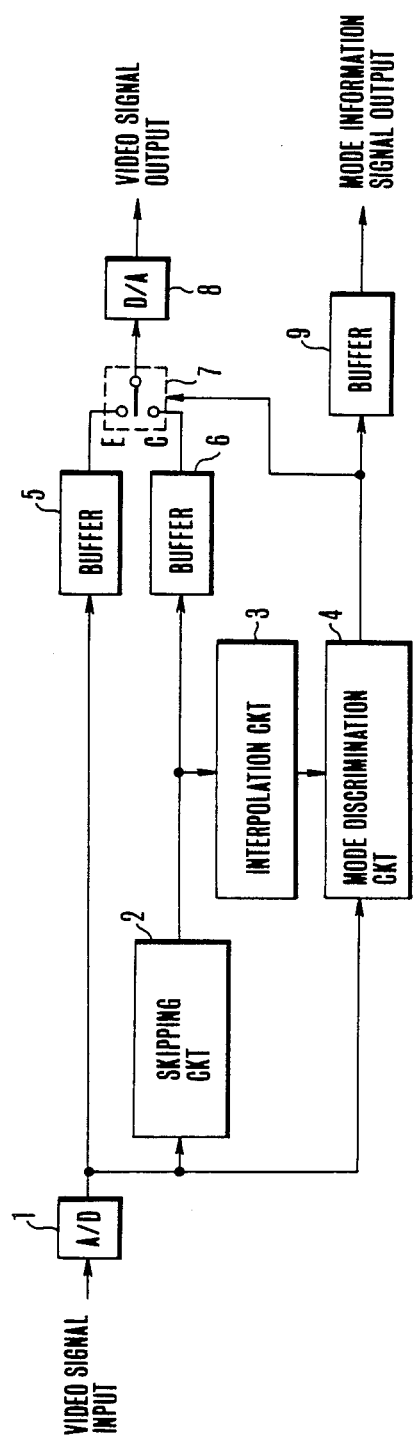
FIG. 3 is a block diagram showing in outline the arrangement of the transmitter side of a transmission system embodying the two-dimensional TAT method.
Figure 4:
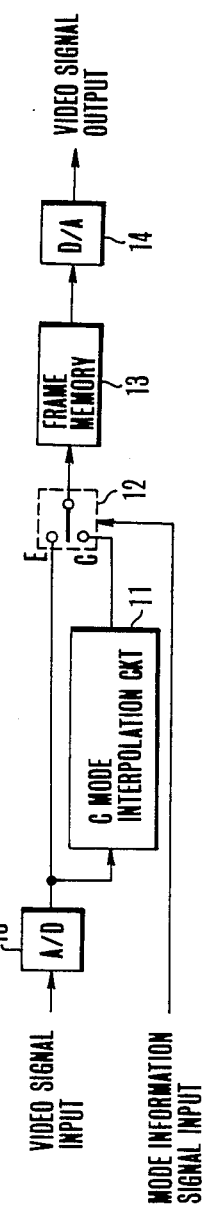
FIG. 4 is a block diagram showing in outline the arrangement of the receiver side of the sam transmission system.
Figure 5:
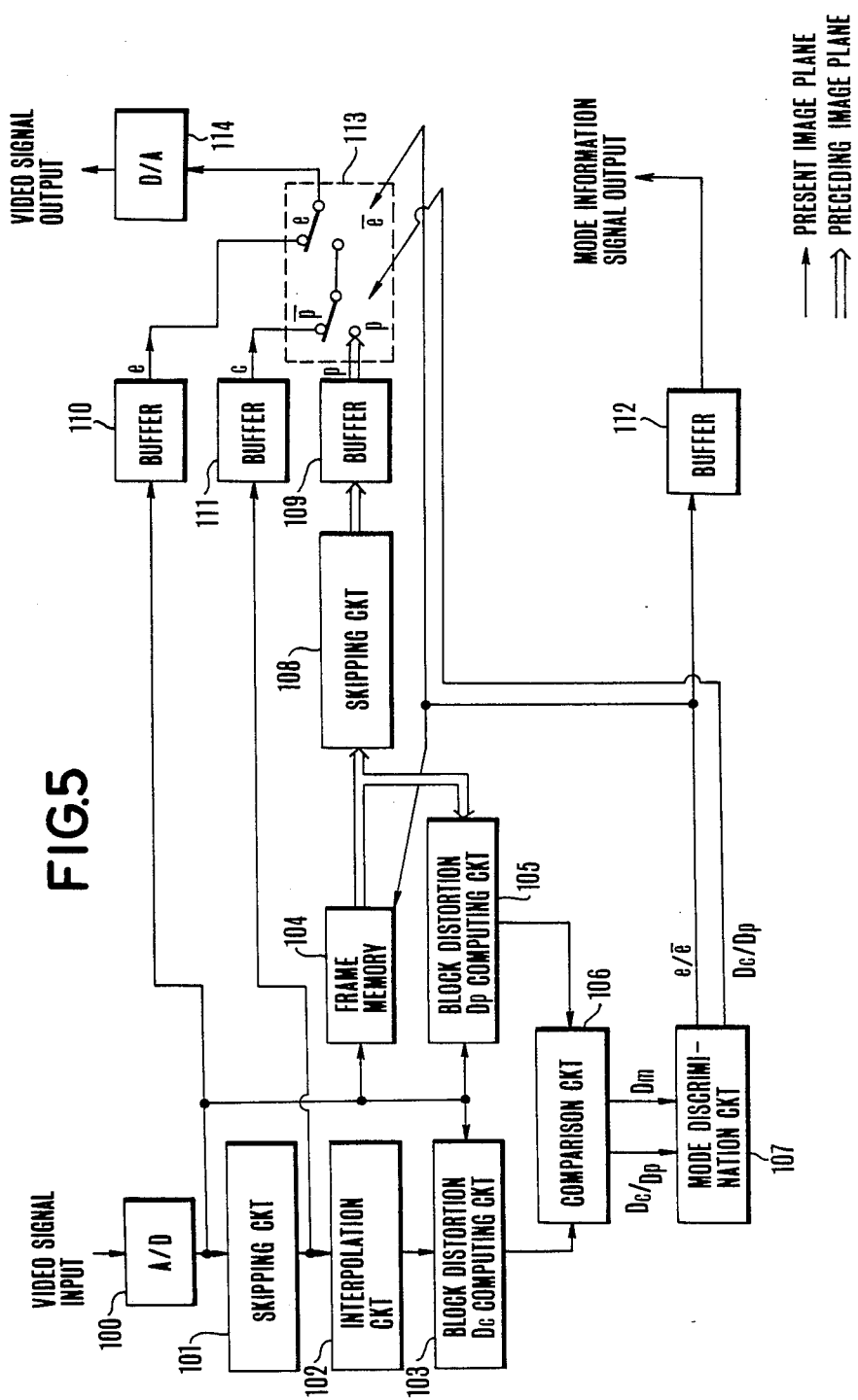
FIG. 5 is a block diagram showing in outline the arrangement of the transmitter side of a transmission system arranged as an embodiment of this invention.

FIG. 5 shows in outline the arrangement of the transmitter of a transmission system arranged as the embodiment of this invention. In this case, the invention is applied also to an analog transmission system. An incoming analog video signal is converted into a digital signal by an A/D converter 100. The digital signal thus produced from the converter 100 includes the whole picture element data. The whole picture element data is supplied, like in the case of the two-dimensional TAT method, to a skipping circuit 101. The circuit 101 performs a skipping operation corresponding to the pattern of the c mode. Then, c mode picture element data (basic picture element data) is obtained. The c mode picture element data is supplied to an interpolation circuit 102, which then performs computation to obtain interpolation picture element data corresponding to the picture element data skipped.

One of the three modes e, c and p in which the picture element data blocks is to be transmitted is determined through the following process: First a difference between reproduced picture element data which is obtainable by transmission in the e mode in the same manner as in the two-dimensional TAT method and reproduced picture element data which is obtainable by transmission in the c mode is computed from the outputs of the A/D converter 100 and the interpolation circuit 102 for each o the picture element blocks. A total of the differences thus obtained (hereinafter referred to as block distortion Dc) is then computed by a block distortion Dc computing circuit 103. The block distortion Dc indicates the correlativity on the image plane of the picture elements within the picture element blocks. In other words, a large value of the block distortion Dc indicates a low correlativity on the image plane and a dense image plane while a small value thereof indicates a high correlativity on the image plane and a sparse image plane. Meanwhile, a frame memory 104 stores the picture element data of the previous image plane. A difference between each picture element data of the previous image plane and that of the present image plane is computed. Then, for every picture element block, a total of the computed differences (hereinafter this total will be referred to as block distortion Dp) is computed by a block distortion Dp computing circuit 105. A comparator 106 is arranged to compare these values Dc and Dp. The block distortion Dp indicates temporal correlativity. A large value of the block distortion Dp shows a low temporal correlativity and thus indicates a moving part of the image plane. A small value of the block distortion Dp shows a high temporal correlativity and thus indicates a still part of the image plane.

In other words, the comparison circuit 106 checks every picture element block to find which of the two transmission modes c and p permits reproduction of the image plane with a better degree of fidelity than in the case of transmission in the e mode. If the result of this is Dc>Dp, the c mode is not employed. In the event of Dc<Dp, the p mode is not employed.

The comparison circuit 106 supplies, along with data (Dc/Dp) indicating which of the values Dc and Dp is larger, a composite block distortion data (Dm) indicating the smaller of the two values Dc and Dp to a mode discrimination circuit 107.

The mode discrimination circuit 107 assigns the e mode to a given number of picture element blocks one by one in the order of blocks having a larger values of the composite distortion Dm. This assigning process is performed in the following manner: The threshold value of the composite distortion D is obtained according to the distribution of the distortion Dm of the whole picture element block in the same manner as in the two-dimensional TAT method. The e mode is assigned to the picture element blocks having the value Dm exceeding this threshold value. The block having the value Dm lower than the threshold value have a transmission mode other than the e mode assigned thereto. In other words, the c mode is assigned to such blocks in the case of Dp>Dc while the p mode is assigned in the case of Dp<Dc. The mode discrimination circuit 107 then produces data e/ē indicative of assignment of the e mode or other modes and data indicative of Dc/Dp.

In the case of this specific embodiment, the transmission system is arranged to transmit only the mode information data e/ē. In this instance, information about whether the transmission mode of the picture element blocks which are not in the e mode is the c mode or the p mode is transmitted in the form of picture element data in the following manner: For the picture element blocks transmitted in the p mode, the basic picture element data of a preceding image plane reproduced on the receiver side is arranged to be transmitted. The whole picture element data of the preceding image plane is stored at the frame memory 104. The stored data is subjected to a skipping process which is performed in the same manner as at the skipping circuit 101 by another skipping circuit 108 so that the basic picture element data of the preceding image plane can be obtained from the circuit 108. Hereinafter, the data produced from the skipping circuit 108 will be called the p mode picture element data. On the receiver side, if the basic picture element data of a certain picture element block of an ensuing image plane remains unchanged from the p mode picture element data, the picture element block is judged to have been transmitted in the p mode. The data stored at the frame memory 104 includes the whole picture element data of the preceding image plane to be reproduced on the receiver side. More specifically, in case that the picture element block of the preceding image plane is in the p mode, the memory 104 must be inhibited from rewriting the picture element data of this block. Further, the picture quality cannot be improved with the c mode picture element block of the preceding image plane processed in the p mode. Accordingly, the data stored at the frame memory 104 is required to be rewritten only when the result of discrimination made by the mode discrimination circuit 107 shows the e mode. Therefore, in this specific embodiment, the rewriting action of the memory 104 is arranged to be controlled by the output e/ē of the mode discrimination circuit 107.

Buffers 109, 110 and 111 are arranged to produce the p mode picture element data, the e mode picture element data and the c mode picture element data which are respectively obtained in the above-stated manner. A switch 113 is arranged to selectively supply one of these data to a D/A converter 114 according to the outputs e/ē and Dc/Dp of the circuit 107. Therefore, the D/A converter 114 is thus arranged to produce an analog video signal obtained by the three-dimensional TAT transmission system arrangement. The output e/ē is also transmitted as mode information via a butter 112.

Figure 6:
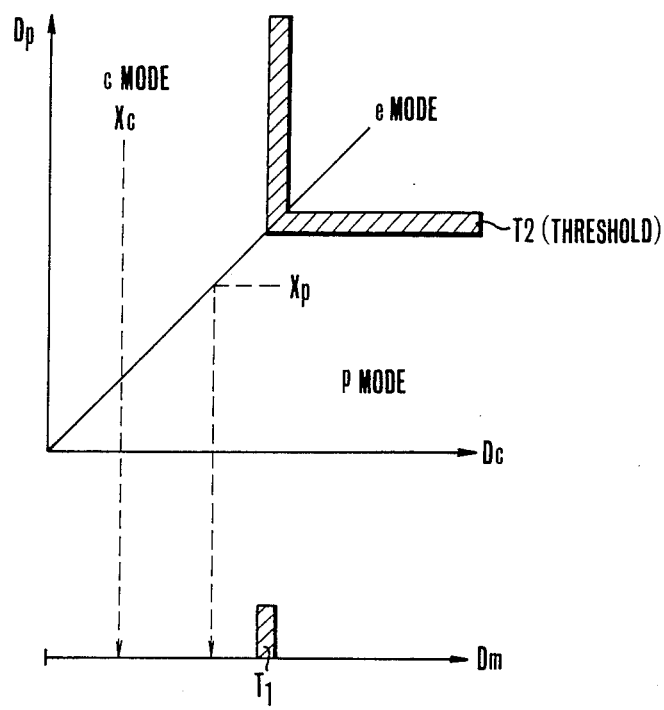
FIG. 6 is an illustration of mode distribution made by the same embodiment according to the nature of each picture element block.
Figure 7:
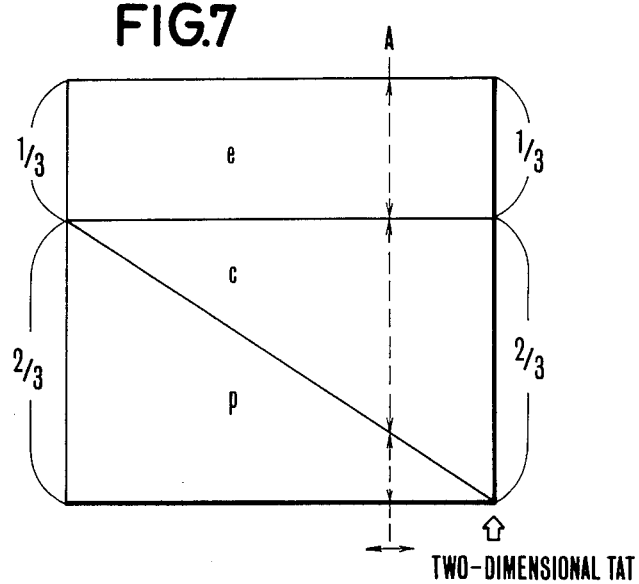
FIG. 7 is an illustration of changes taking place in a mode distribution ratio set by the same embodiment according to the temporal correlativity among images.

The distribution ratio between these different transmission modes used in the embodiment described is as follows: FIG. 6 shows the mode distribution to the block distortions Dp and Dc. FIG. 7 shows changes in the distribution ratio according to the temporal correlativity of image planes. Referring to FIG. 6, let us consider the block distortions Dc and Dp of picture element blocks on the axes Dc and Dp of FIG. 6. The larger the degree of motion of a block, the higher its location on the axis Dp. In other words, the symbol Dp represents data relative to the temporal correlation. Meanwhile, the block of a higher degree of elaborateness, i.e. a block having a higher two-dimensional frequency is located farther on the right-hand side on the axis Dc. Another axis Dm is for another data Dm which takes the smaller of the values of the distortions Dc and Dp as mentioned in the foregoing. Therefore, the data Dm relates to the stronger one of the two different correlativities, the planar and temporal correlativities. The value Dm of a picture element block having the values Dc and Dp at a point Xc in FIG. 6 is located at a point obtained on the axis Dc by drawing a line from the point Xc perpendicularly to the axis Dc. Meanwhile, the value Dm of a picture element block having the values Dc and Dp at a point Xp is located at another point on the axis Dc which is obtained by drawing a line from the point Xp perpendicularly to the axis Dp and further drawing another line from a crossing point between the perpendicular line and a straight line of Dc=Dp perpendicularly to the axis Dc.

With the axis Dm provided in FIG. 6, a threshold value T1 is assumed to be set on the axis Dm. Then, the threshold value is located on a coordinate Dc-Dp as indicated by a reference symbol T2. Then, a region of the e mode is determined as shown in FIG. 6. In other words, a picture element block showing a salient motion and having a high degree of elaborateness is generally transmitted in the c mode.

As regards the distribution ratio between the different modes, FIG. 7 shows a case wherein the data compressing rate for the whole of each image plane is fixedly set at ½. In this instance, the picture element data to be transmitted in the p mode is assumed to be ⅓ of the total picture element data and to be equal to the data to be transmitted in the c mode. Therefore, the number of picture element blocks that can be transmitted in the e mode in this instance always becomes ⅓ of the total number of blocks. In FIG. 7, a straight line part forming the right side shows the distribution ratio of the two-dimensional TAT method. In other words, in the three-dimensional TAT transmission system, transmission process is performed in exactly the same manner as in the two-dimensional TAT method in cases where there is no correlation at all between preceding and ensuing image planes. Whereas, in transmitting a completely still image plane, the picture element block to be transmitted in the c mode comes to disappear. Then, the resolution of a reproduced image plane becomes the same as that of a reproduced image plane obtained by transmitting all the picture element blocks in the e mode. The mode distributing ratio for an image plane is as represented by the length of line segment defined on a broken line A by crossing points between the broken line and lines defining the regions e, c and p. The position of the broken line A depends, as apparent from the foregoing description, upon the temporal correlativity of the image information to be transmitted.

Figure 8:
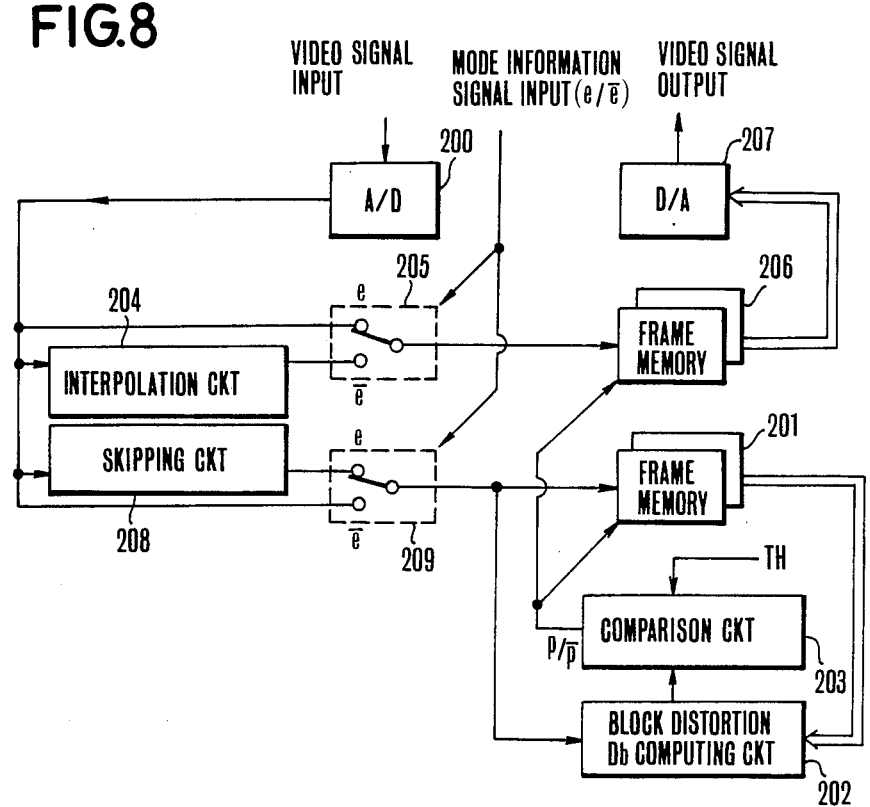
FIG. 8 is a block diagram showing in outline the arrangement of the receiver side of the same embodiment.

FIG. 8 shows in outline the arrangement of the receiver of the same transmission system embodying this invention. The analog video signal which is transmitted from the transmitter side shown in FIG. 5 is received at an A/D converter 200 to be brought back to digital data. A switch 205 is arranged to be controlled b the mode information transmitted. For each of the picture element blocks, the switch 205 allows all the picture element data thereof to be produced as it is if the block is transmitted in the e mode. In the event of transmission in a mode other than the e mode, interpolation picture element data formed by an interpolation circuit 204 is produced through one side or terminal e of the switch 205. The interpolation picture element data of course corresponds to the skipped picture element data skipped on the side of the transmitter. All the picture element data formed on the basis of the transmitted picture element data is thus produced from the switch 205.

Another switch 209 is arranged to produce via a skipping circuit 208 only the basic picture element data of each picture element block transmitted in the e mode. The basic picture element data of a picture element block that is transmitted in a mode other than the e mode is allowed to be produced as it is from the switch 209. The switch 209 is also under the control of the mode information transmitted. The switch 209 thus produces the basic picture element data, which is supplied to a frame memory 201 for basic picture elements.

Further, a difference between the basic picture element data produced from the switch 209 and the basic picture element data of the preceding image plane which is produced from the frame memory 201 is obtained by computation. For each of the picture element blocks, a total of the difference values thus obtained (hereinafter referred to as block distortion Db) is then obtained by computation performed at a block distortion Db computing circuit 202. The block distortion data Db thus obtained is supplied to a comparison circuit 203, which compares it with a threshold value TH. If the value Db is found to be smaller than the threshold value TH, the picture element block is determined to have been transmitted in the p mode. The comparison circuit 203 then produces mode information P/$\overline{P}$ indicative of whether the picture element block is in the p mode or in a mode other than the p mode. The mode information P/$\overline{P}$ is supplied to frame memories 201 and 206. Then, for a picture element block which is transmitted in the p mode, a rewriting action on the frame memories 201 and 206 is inhibited according to this mode information. In that event, the data of an immediately preceding image plane is retained as it is. If the retained picture element data is in the e mode, an adequately reproduced picture can be obtained.

The data of the frame memory 206 which is for all the picture elements is renewed in this manner. Concurrently with this, a reading action is performed on a D/A converter 207. Then, an analog video signal of a high degree of resolution is produced from the D/A converter 207. It is apparent that the transmission system which is arranged in this manner gives an analog video signal of high resolution for still part of the image plane.

In the embodiment described, the data Dc which relates to correlativity within a frame and the data Dp which relates to correlativity between frames are used in selecting a transmission mode between the c mode and the p mode. As a result, the degree of deterioration in resolution which results from transmission in the p mode can be found, so that the p mode can be advantageously employed.

In the embodiment described, the data Dc which relates to planar correlation within each block and the data Dp which relates to temporal correlation are compared and the smaller of the two data values is employed as the data Dm. The e mode is assigned to some of the picture element blocks within each image plane in the order of blocks having a larger value of this data Dm. Therefore, any picture element block that is reproducible with high resolution by virtue of c mode interpolation or use of data of a preceding image plane is not handled in the e mode. This arrangement permits highly efficient allotment of the e mode, so that a reproduced picture can be obtained with a high degree of resolution.

Figure 9:
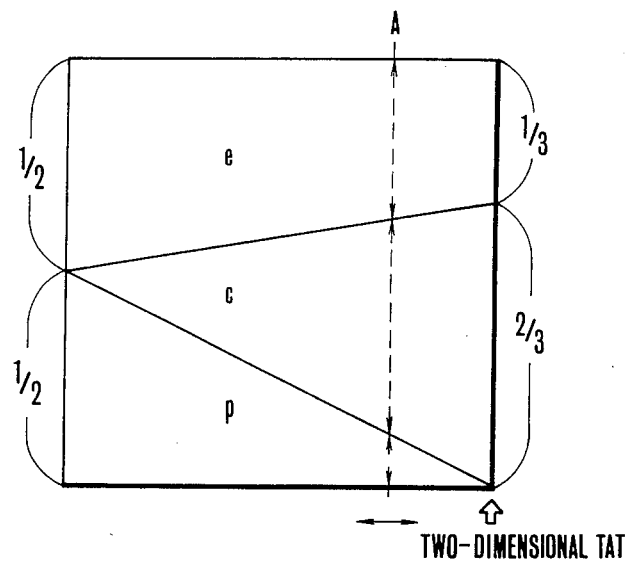
FIG. 9 is an illustration of changes taking place in the mode distribution ratio according to the temporal correlativity of images in cases where the picture element data of the preceding image plane is not transmitted.

Further, in the transmission system described as an embodiment of this invention, the mode information indicative of the p mode is arranged not to be transmitted. However, this arrangement may be modified to have the mode information transmitted and to have the picture element data of the preceding image plane not transmitted. In the case of this modification, the distribution or allotment ratio among the modes e, c and p becomes as shown in FIG. 9, which is on the assumption that the compressing rate is fixed at ½. As clearly shown, the transmission process is performed in the same manner as in the case of the two-dimensional TAT method if there is no correlation between the preceding and ensuing image planes. Further, in the event of a high degree of correlativity in the time axial direction, the number of picture element blocks to be transmitted in the e mode increases, so that the reproduced picture quality can be greatly enhanced.

In FIG. 9, a straight line part forming the right side of the illustration (representing a case where there takes place a salient motion over the whole image plane) shows the distribution ratio according to the two-dimensional TAT method in the same manner as in the case of FIG. 7. Meanwhile, in the case of transmitting a completely still or motionless image plane, no picture element is transmitted in the c mode. In that instance, however, the ratio of the picture element blocks to be transmitted in the e mode to a total number of blocks (a straight line part forming the left side of the illustration) becomes ½ and that of those to be transmitted in the p mode also becomes ½. The average band compression rate under these conditions can be expressed as $1 \times \frac{1}{3} + \frac{1}{4} \times \frac{2}{3} = \frac{1}{2}$ on the right side and as $1/1 \times \frac{1}{2} + 0 \times \frac{1}{2} = \frac{1}{2}$ on the left side. Further, assuming that the ratio of the number of picture element blocks to which the p mode is assigned to the total number of blocks is $X$ $(0 \leq X \leq \frac{1}{2})$, that of the e mode blocks becomes $(1+X)/3$ and that of the c mode blocks $(2-4X)/3$. Therefore, the average band compression rate of the whole image plane always becomes $(1+X)/3 \times 1 + (2-4X)/3 \times \frac{1}{4} = \frac{1}{3} + 1/6 = \frac{1}{2}$.

Since the embodiment described is arranged to have information transmitted in an unvarying amount, the transmission time per image plane remains unvarying with data transmitted at fixed regular intervals, Therefore, band compression can be accomplished by utilizing both the planar correlativity and the temporal correlativity without necessitating complex hard-ware arrangement.

Further, in accordance with this invention, the transmission system may be arranged to have the temporal correlativity discriminated only on the side of the receiver and to appropriately use previously transmitted data without additionally providing the p mode.

What is claimed is:

1. A system for transmitting an image information signal consisting of information signals corresponding to picture elements, whereby each of continuous pictures consists of a certain predetermined number of picture elements, comprising:
  (A) picture element data forming means for forming a plurality of kinds of picture element data to be transmitted, said picture element data forming means being arranged to receive said image information signals for every one of picture planes and to form said plurality of kinds of picture element data, from the received image information signals for one picture plane on the basis of a plurality of kinds of transmitted picture element forming modes which involve picture element data to be transmitted which are different from each other in number contained in a unit picture element block consisting of a predetermined number of picture elements;
  (B) selecting means for selecting a kind of transmission mode, said selecting means being arranged to divide the received image information signals for one picture plane into said unit picture element blocks and to select either one of the plurality kinds of transmitted picture element forming modes and a non-transmission mode in which no information signal of the picture element in the unit picture element block for the picture plane is transmitted, depending upon a correlation of the respective ones of the divided unit picture element blocks; and
  (C) transmitted signal forming means for forming the signal to be transmitted, said transmitted signal forming means being arranged to select any one of the transmitted picture element data out of the plurality kinds of picture element data formed by said transmitted picture element data forming means, on the basis of the kind of transmission mode selected by said transmitted picture element mode selecting means for every ones of the unit blocks of the received image information signals for one picture plane.

2. A system according to claim 1, wherein said transmitted picture element mode selecting means includes:
  (a) inter-block correlation detecting means for detecting inter-block correlation of the information signals corresponding to the picture elements constituting the unit picture element block, said inter-block correlation detecting means being arranged to divide the received image information signals for one picture plane into those of every ones of said unit picture blocks and to detect said inter-block correlation between the blocks of the picture elements;
  (b) in-block correlation detection means for detecting in-block correlation of the information signals corresponding to the picture elements constituting the unit picture element block, said in-block correlation detecting means being arranged to divide the received image signals for one picture plane into those of every ones of said unit picture blocks and to detect the in-block correlation of the information signals corresponding to the picture elements constituting the unit picture element block, with respect to the respective ones of the divided unit picture block; and
  (c) transmission mode allocation means arranged to compare the inter-block correlation detected by said inter-block correlation detecting means and the in-block correlation detected by said in-block correlation detecting means and to allocate one of said plurality of kinds of transmitted picture element forming modes and said non-transmission mode to each one of the blocks, depending upon a result of comparison.

3. A system according to claim 2, wherein said inter-block correlation detecting means includes holding means for holding the image information signals of an already received past picture plane and it is arranged to detect the inter-block correlation by comparing received current image information signals with the information signals of the past picture plane held by said holding means.

4. A system according to claim 2, wherein said in-block correlation detecting means includes sampling means for effecting picture element sampling of the received image information signals according to a predetermined sampling mode for every one of the respective unit picture element blocks and restoring means arranged to interpolate the information signals of the picture elements, which have not been sampled, by using the information signals of the picture elements sampled by said sampling means and to restore the original image information signals, and it is arranged to detect the in-block correlation by comparing the received image information signals and image information signals outputted by said restoring means, for every ones of the unit picture element blocks.

5. A system for transmitting an image information signal consisting of information signals corresponding to picture elements, whereby each of continuous pictures consists of a plurality of picture elements, comprising:

(A) picture element data forming means for forming a plurality of kinds of picture element data to be transmitted, said picture element data forming means being arranged to receive said image information signals for every one of picture planes and to form said plurality of kinds of picture element data, from the received image information signals for one picture plane on the basis of a plurality of kinds of transmitted picture element forming modes which involve picture element data to be transmitted which are different from each other in number contained in a unit picture element block consisting of a predetermined number of picture elements;

(B) inter-block correlation detecting means for detecting inter-block correlation of the information signals corresponding to the picture elements constituting the unit picture element block, said inter-block correlation detecting means being arranged to divide the received image information signals for one picture plane into those of every ones of said unit picture blocks and to detect said inter-block correlation between the blocks of the picture elements;

(C) in-block correlation detection means for detecting in-block correlation of the information signals corresponding to the picture elements constituting the unit picture element block, said in-block correlation detecting means being arranged to divide the received image signals for one picture plane into those of every ones of said unit picture blocks and to detect the in-block correlation of the information signals corresponding to the picture elements constituting the unit picture element block, with respect to the respective ones of the divided unit picture block; and (D) transmission mode allocation means arranged to compare the inter-block correlation detected by said inter-block correlation detecting means and the in-block correlation detected by said in-block correlation detecting means and to allocate the non-transmission mode, in which the information signals of the picture elements in the unit picture block of the received picture plane are not transmitted, to n unit picture element blocks (n is a positive integer) per one picture plane, according to a result of comparison; and (E) transmission signal forming means for forming transmission signals, by using any one of the plurality of kinds of the transmitted picture element data formed by said transmitted picture element data forming means, for the unit picture element block for which the non-transmission mode has not been allocated by said non-transmission mode allocating means among the unit picture element blocks of the image information signal for the received one picture plane.

6. A system according to claim 5, wherein said inter-block correlation detecting means includes holding means for holding the image information signals of an already received past picture plane and it is arranged to detect the inter-block correlation by comparing received current image information signals with the information signals of the past picture plane held by said holding means.

7. A system according to claim 5, wherein said in-block correlation detecting means includes sampling means for effecting picture element sampling of the received image information signals according to a predetermined sampling mode for every one of the respective unit picture element blocks and restoring means arranged to interpolate the information signals of the picture elements, which have not been sampled, by using the information signals of the picture elements sampled by said sampling means and to restore the original image information signals, and its is arranged to detect the in-block correlation by comparing the received image information signals and image information signals outputted by said restoring means, for every ones of the unit picture elements blocks.

* * * * *